2,715,653
PRIMARY CELL

Raymond W. Reid, Sanford, Mich., assignor to The Dow Chemical Company, Midland, Mich., a corporation of Delaware No Drawing. Application February 27, 1952, Serial No. 273,787

6 Claims. (Cl. 136—100)

The invention relates to primary cells utilizing magnesium as the anode material. It more particularly concerns primary cells of the foregoing type having an electrolyte of a bromide of the alkali metals, the alkali earth metals, or ammonium, and a carbon (or graphite) cathode depolarized with manganese dioxide.

Primary cells utilizing magnesium as the anode material and having an electrolyte of a bromide of an alkali metal, an alkaline earth metal or ammonium, and a cathode comprising carbon depolarized with manganese dioxide have the pecularity of yielding their voltaic energy at a relatively high voltage for a short time at the beginning of the life of the cells. This behavior of these cells is highly disadvantageous in some applications. For example, the conventional flash light bulbs designed to operate efficiently on the normal working voltage of these cells, which is attained shortly after a relatively small amount of the available energy has been taken from the cell, tend to burn out prematurely when used on fresh cells, the voltage of which is relatively high.

The detailed formulations of primary cells utilizing magnesium as the anode material and exhibiting the voltage characteristics described above are set forth in U. S. Patents 2,547,907 and 2,547,908. According to these patents, the cells may be made up either as wet cells or "dry" cells as understood in the art. It is an object of the present invention to so modify the formulations of the primary cells set forth in the foregoing patents, that the initial voltage of the cells is more nearly the same as the working voltage. Other objects and advantages will become apparent from the following description of the invention.

The invention is predicated upon the discovery that by including in the cathode mix about 0.1 to 1.5 per cent by weight of a finely divided metal below and including magnesium in the electromotive force series of metals of the group consisting of aluminum, bismuth, cobalt, copper, iron, lead, magnesium, manganese, nickel, tin, zinc, the initial voltage of the cell is reduced substantially below that of similar cells having the conventional cathode mix. The invention then consists of the improved primary cell herein fully described and particularly pointed out in the claims.

In carrying out the invention, the cell is made up with the usual voltaic arrangement of an anode, cathode, and electrolyte. In this arrangement, the anode is magnesium or magnesium base alloy in which the magnesium content exceeds 50 per cent and preferably exceeds 80 per cent by weight. The electrolyte comprises an aqueous solution of a bromide of an alkali metal, alkaline earth metal or ammonium bromide, with or without corrosion inhibiting amounts of a chromic acid salt of a base consisting of an alkali metal base, or an alkaline earth metal base including magnesium and ammonium. A suitable concentration for the electrolyte is between about 30 grams per liter of the bromide up to an amount which produces a saturated solution with water. A generally suitable concentration is between about 150 and 500 grams of the bromide per liter of the solution. The term "alkaline earth metal bromide" as herein used includes the bromides of Mg, Ca, Ba, and Sr. Of these, magnesium bromide is to be preferred and is used in a concentration of about 300 grams per liter. If desired, mixtures of the bromides may be used.

The cathode comprises an inert conductor such as a piece of carbon or graphite to which a terminal may be affixed, if desired, and a depolarizer of manganese dioxide having in admixture therewith from about 5 to 25 per cent by weight of finely divided carbon black such as acetylene black. Preferred proportions of carbon black are about 5 to 15 per cent by weight, 10 per cent being generally satisfactory. If desired, from 0.1 to 10 per cent by weight of one of the water insoluble chromates: barium chromate, lead chromate, and zinc chromate may be included in the cathode mix as set forth in the copending application of Roy C. Kirk et al. Serial No. 147,568, filed March 3, 1950.

In accordance with the invention, there is incorporated in the cathode mix from about 0.1 to 1.5 per cent by weight of one of the metals listed in the foregoing group in finely divided form. Preferred proportions of the metals are from about 0.25 to 0.5 per cent by weight of the dry cathode mix. The size of the metal particles is more or less critical, best results being had with particles having sizes passing through a 50 mesh standard sieve while being mostly all retained upon a 325 mesh sieve. The cathode mix ingredients of carbon, manganese dioxide, metal powder, and insoluble chromate, if any, are preferably mixed together in the dry state, as in a ball mill before incorporating electrolyte. About 5 minutes of mixing suffices to produce a uniform dry mixture. Then the mixture may be moistened with electrolyte. This is best accomplished by mixing the previously mixed dry cathode materials together with electrolyte in a pony mill. The amount of electrolyte used to thus moisten the cathode mix is not sharply critical. A generally suitable amount is about 36 cc. of electrolyte per 100 grams of dry cathode mixture.

The cells may be assembled in any convenient manner employing the metal powder-containing cathode mix, prepared as described, in the same voltaic arrangement as that employed in conventional cells. The cells may be either "wet" or "dry" as understood in the art. In general, it is contemplated that the most useful application of the invention is in the "dry" cell field.

As illustrative of the invention as applied to dry cells a number were assembled in D size (flash light size) in the usual manner with cathode mixes containing metal powders in accordance with the invention as well as cathode mixes without metal powders for comparison. The cells thus assembled were subjected to a continuous discharge through a resistance of 7.5 ohms until the voltage declined to well below the initial peak voltage. In assembling these cells, a magnesium base alloy having a nominal composition of 3 per cent of aluminum, 1 per cent of zinc, 0.1 per cent manganese, and 0.15 per cent of calcium was formed into the cathode in the form of a cylindrical can 2¼" high x 1¼" O. D., the wall thickness being 0.050 inch. The cans were lined with paper and then charged with the cathode mix moistened with electrolyte consisting of an aqueous solution of 250 grams per liter of magnesium bromide and 0.2 gram per liter of sodium chromate, the amount of electrolyte solution used being 300 cc. per 1000 grams of dry cathode mix. A central carbon electrode for the anode connection, in the form of a 5/16 inch diameter rod, was inserted into the center of the charge of moistened cathode mix after the cathode mix was placed in the can. The cathode mixes were formulated both with and without a water insoluble chromate ($BaCrO_4$), those with $BaCrO_4$ being formulated in the proportions of 91 parts by weight of $MnO_2$, 6 parts of acetylene black, and 3 parts of $BaCrO_4$ per 100 parts of the dry cathode mix (exclusive of metal powder); those without $BaCrO_4$ being formulated in the proportions of 94 parts by weight of $MnO_2$ and 6 parts of acetylene black per 100 parts of the dry mix (exclusive of metal powder). Cells so formulated together with hourly voltage readings while discharging through a 7.5 ohm resistor are set forth in the accompanying table.

TABLE

| Cell No. | Cathode Mix | | | Metal Powder | | Voltage Readings While Discharging | | | | | Initial Voltage Lowering (1 hr.) |
|---|---|---|---|---|---|---|---|---|---|---|---|
| | | | | | | Time, Hours | | | | | |
| | $MnO_2$ | A. B. | $BaCrO_4$ | Kind | Percent | 0 | 1 | 2 | 3 | 4 | |
| 1 [1] | 94 | 6 | | | | 1.86 | 1.56 | 1.48 | 1.42 | 1.38 | Blank |
| 2 | 91 | 6 | 3 | | | 1.94 | 1.62 | 1.54 | 1.50 | 1.47 | Blank |
| 3 [2] | 91 | 6 | 3 | Mg | 0.25 | 1.73 | 1.48 | 1.44 | 1.42 | 1.40 | 0.21 |
| 4 [1] | 94 | 6 | | Mg | 0.50 | 1.68 | 1.53 | 1.47 | 1.42 | 1.39 | 0.18 |
| 5 [1] | 94 | 6 | | Pb | 0.5 | 1.74 | 1.54 | 1.48 | 1.44 | 1.41 | 0.12 |
| 6 [1] | 94 | 6 | | Al | 0.5 | 1.78 | 1.55 | 1.50 | 1.47 | 1.44 | 0.08 |
| 7 [1] | 94 | 6 | | Fe | 0.5 | 1.73 | 1.58 | 1.53 | 1.49 | 1.47 | 0.13 |
| 8 | 91 | 6 | 3 | Fe | 0.5 | 1.73 | 1.48 | 1.43 | 1.40 | 1.38 | 0.21 |
| 9 | 91 | 6 | 3 | Bi | 0.5 | 1.74 | 1.57 | 1.48 | 1.44 | 1.41 | 0.20 |
| 10 [1] | 94 | 6 | | Zn | 0.5 | 1.73 | 1.54 | 1.47 | 1.44 | 1.40 | 0.13 |
| 11 | 91 | 6 | 3 | Zn | 0.5 | 1.81 | 1.57 | 1.52 | 1.47 | 1.44 | 0.13 |
| 12 | 91 | 6 | 3 | Mn | 0.5 | 1.83 | 1.54 | 1.50 | 1.47 | 1.45 | 0.11 |
| 13 | 91 | 6 | 3 | Ni | 0.5 | 1.68 | 1.52 | 1.43 | 1.41 | 1.37 | 0.26 |
| 14 | 91 | 6 | 3 | Sn | 0.5 | 1.71 | 1.53 | 1.47 | 1.43 | 1.41 | 0.23 |
| 15 | 91 | 6 | 3 | Co | 0.5 | 1.71 | 1.52 | 1.46 | 1.42 | 1.38 | 0.23 |
| 16 | 91 | 6 | 3 | Cu | 0.5 | 1.72 | 1.58 | 1.49 | 1.45 | 1.42 | 0.22 |

[1] Average of two cells.
[2] Average of 3 cells.
A. B. = acetylene black.

Referring to the data in the table, it is manifest that the cells having a metal powder in the cathode mix (cells 3 to 16 inclusive) have a substantially lower initial operating voltage compared to cells having a conventional cathode mix i. e., cells No. 1 or a similar cathode mix containing insoluble chromate e. g., cell No. 2. Thus, the cells formulated according to the invention may be used with conventional flash light bulbs or other electrical equipment with greatly reduced risk of premature failure of the equipment.

In this connection particulated magnesium powder has the added advantage of having a desirable effect on the capacity of the cell. For example, D size dry cells having the formulation of cells 1 of the table required 22.5 hours of continuous discharge through a 7.5 ohm resistance to reach an end voltage of 0.9, while similar cells containing particulated magnesium (cells 44) discharge continuously through a similar resistance for 24.7 hours before the cells' voltage declined to 0.9 volt.

The term "magnesium" is used herein and in the appended claims to mean magnesium and the magnesium base alloys in which the magnesium content exceeds 50 per cent by weight.

I claim:
1. In a primary cell having in combination an anode comprising magnesium, a cathode comprising a mixture of carbon and a depolarizer of manganese dioxide, and an aqueous electrolyte comprising the bromide of a base selected from the group consisting of the alkali metals, the alkali earth metals and ammonium, the improvement which consists in including in the said mixture from 0.1 to 1.5 per cent by weight on the dry basis of a particulated metal below and including magnesium in the electromotive force series of metals selected from the group consisting of aluminum, bismuth, cobalt, copper, iron, lead, magnesium, manganese, nickel, tin, and zinc, said particulated metal being in particles substantially all passing through a No. 50 while being retained on a No. 325 standard sieve.

2. A primary cell according to claim 1 wherein the particulated metal in the cathode mixture is magnesium.

3. A primary cell according to claim 1 wherein the particulated metal in the cathode mixture is lead.

4. A primary cell according to claim 1 wherein the particulated metal in the cathode mixture is aluminum.

5. A primary cell according to claim 1 wherein the particulated metal in the cathode mixture is manganese.

6. A primary cell according to claim 1 wherein the particulated metal in the cathode mixture is zinc.

References Cited in the file of this patent
UNITED STATES PATENTS

| 1,288,722 | Snelling | Dec. 24, 1918 |
| 2,481,204 | Delong | Sept. 6, 1949 |
| 2,547,907 | Fry | Apr. 3, 1951 |
| 2,547,908 | Fry | Apr. 3, 1951 |